(12) United States Patent  
Cooke et al.

(10) Patent No.: US 8,655,769 B2  
(45) Date of Patent: Feb. 18, 2014

(54) METHOD AND SYSTEM FOR IMPROVING EQUITY TRADE ORDER ACKNOWLEDGEMENT TIMES

(75) Inventors: James Cooke, Cary, NC (US); Sridhar Rao, Raleigh, NC (US); John Robison, Wilmington, NC (US); Ron Bauman, Cary, NC (US)

(73) Assignee: Cape City Command, LLC, Wilmington, NC (US)

( * ) Notice: Subject to any disclaimer, the term of this patent is extended or adjusted under 35 U.S.C. 154(b) by 0 days.

(21) Appl. No.: 13/490,570

(22) Filed: Jun. 7, 2012

(65) Prior Publication Data

US 2013/0246239 A1 Sep. 19, 2013

Related U.S. Application Data

(60) Provisional application No. 61/611,928, filed on Mar. 16, 2012.

(51) Int. Cl.  
*G06Q 40/00* (2012.01)

(52) U.S. Cl.  
USPC .......................................... 705/37; 705/36 R

(58) Field of Classification Search  
USPC .......................................... 705/35, 36 R, 37  
See application file for complete search history.

(56) References Cited

U.S. PATENT DOCUMENTS

| 7,242,669 | B2 | 7/2007 | Bundy et al. |
| 2002/0194310 | A1 | 12/2002 | Chu et al. |
| 2005/0074033 | A1 | 4/2005 | Chauveau |
| 2012/0330817 | A1* | 12/2012 | Brkic et al. ..................... 705/37 |

FOREIGN PATENT DOCUMENTS

WO 0217559 A2 2/2002

OTHER PUBLICATIONS

Extended European Search Report mailed by the European Patent Office on Jun. 7, 2013 in connection with European Application No. 13000985.5-1955.

* cited by examiner

*Primary Examiner* — Ojo O Oyebisi  
(74) *Attorney, Agent, or Firm* — Cooper & Dunham LLP

(57) ABSTRACT

A method and system for improving stock exchange equity trade order acknowledgment times including a network appliance ("trade accelerator") in the sub-network of the trading platforms, having a specialized network flow processor with associated micro-code and a host processor running specialized software. Specialized network appliance software sensitive to trading protocols for communicating between trading platforms and exchange servers detects latency variations in trade order acknowledgments at the exchange and recommends to subscribing trading platforms a least latency trade order path.

4 Claims, 20 Drawing Sheets avg time to acknowledge an order = avg time to acknowledge an order +
((time it took to get an ACK for this order − avg time)/total orders tracked)

expected time of completion of all pending transactions on this flow =
number of pending ORDER ENTRY requests x avg time to acknowledge an order +
number of pending CANCEL ORDER request x avg time to cancel an order avg time to cancel an order = avg time to cancel an order +
   ((time it took to cancel this order − avg time to cancel an order)/total pending cancel orders)

expected time of completion of all pending transactions on this flow =
   number of pending ORDER ENTRY requests x avg time to acknowledge an order +
   number of pending CANCEL ORDER request x avg time to cancel an order

US 8,655,769 B2

METHOD AND SYSTEM FOR IMPROVING EQUITY TRADE ORDER ACKNOWLEDGEMENT TIMES

CROSS REFERENCE TO RELATED APPLICATION

This application claims the benefit of U.S. Provisional Application No. 61/611,928, filed Mar. 16, 2012.

FIELD OF THE INVENTION

The present invention relates in general to the electronic performance of equity trade transactions, and electronic methods and systems for analyzing network latency to quickly carry out such trades.

BACKGROUND OF THE INVENTION

Due to popularity of high frequency algorithmic trading, reducing latency in order acknowledgment times is becoming important. The chances of filling trade orders are higher if the trade order reaches the exchange quicker. It is generally believed that profits are correlated with order fill rate so the greater the fill rate the greater the profits.

Several methods have been proposed to reduce the latency, including faster transmission lines, kernel bypass methods for transmission and reception of data at the trading engine, and physical co-location of the trading engine at the exchange facility. While such methods are very effective in getting the trade order across to the exchange very quickly, they do not take into consideration the latency introduced at the exchange itself due to heavy trading volumes. This latency serves to delay order acknowledgment times on certain exchange ports (also called flows) at certain times. The delays are temporal and random in nature. Trading engine software typically uses a 'round-robin' algorithm to distribute trade orders evenly across multiple exchange ports. However, this can increase order acknowledgment times on those exchange ports that have a heavy load on them particularly during busy periods.

Therefore, it would be beneficial to have improved systems and methods for reducing latency in order acknowledgment times, and especially systems and methods which take into consideration the latency introduced at the exchange itself.

SUMMARY OF THE INVENTION

This invention, which preferably includes a trade accelerator and a set of application programming interfaces ("APIs"), solves or reduces the exchange latency problem by tracking order acknowledgment times and providing a 'least latency' path recommendation to the trading engine software. By using this recommendation, the trading engine is able to transmit trade orders to exchange servers that are relatively lightly loaded thereby obtaining faster order acknowledgment times.

In certain embodiments, the invention provides a method and system for improving stock exchange equity trade order acknowledgment times includes a network appliance ("trade accelerator") in the sub-network of the trading platforms, having a specialized network flow processor with associated micro-code, and a host processor running specialized software. Specialized network appliance software sensitive to trading protocols for communicating between trading platforms and exchange servers detects latency variations in trade order acknowledgments at the exchange and recommends to subscribing trading platforms a least latency trade order path. These recommendations can be used to identify and transmit trade orders to the least latency exchange server. Trading platform software uses APIs to subscribe to and receive recommendations. The network appliance adapts to the temporal nature of latency at exchange servers and adjusts recommendations in real time. Path latency between the trading platform and exchange servers and also latency introduced by heavy trading period server loads are taken into account.

DETAILED DESCRIPTION OF THE PREFERRED EMBODIMENTS

Figure 1:
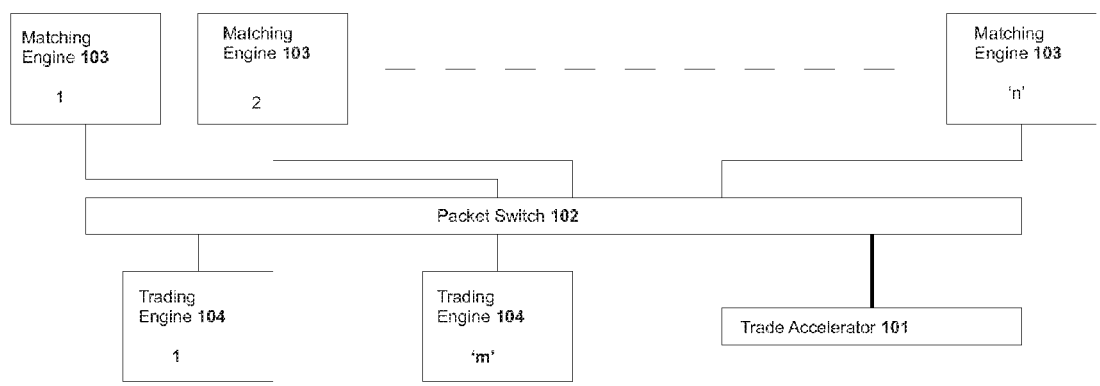
FIG. 1 is a reference hardware view, showing one embodiment of an electronic system according to the present invention. According to this embodiment, a trade accelerator 101 is connected via a packet switch 102 to n matching engines 103 and m trading engines 104. In various embodiments, the number n may be one or a plurality. In various embodiments, the number m may also be one or a plurality.

FIG. 1 shows the preferred placement of the trade accelerator 101 in a trading network. The terms trading platform and trading engine are used interchangeably. The terms exchange servers and matching engines are used interchangeably. The trading engine is the entity that places trade orders to buy or sell equities. The matching engines are operated by the stock exchange and serve to match 'buy' orders with 'sell' orders so that the orders may be filled using an order-matching algorithm. The trade accelerator is a network appliance that, in certain embodiments, assists trading engines place orders quickly by recommending an appropriate matching engine from a list of predefined matching engines that has the least latency. In certain embodiments, the recommendations vary in real time depending upon the volume of orders being placed and the number of matching engines to which the trading engines have access.

With reference to the embodiment shown in FIG. 1, Trading engines 104 1 to 'm' submit trade orders to matching engines 103 1 to 'n' for execution. The trade accelerator 101 is preferably placed in the same sub-network as the trading engines 104 using a packet switching device ("Packet Switch" 102), such as those which are known in the art. Placing the trade accelerator 101 in this sub-network increases its efficiency and accuracy. The packet switch 102 preferably has port-mirroring capability (also called SPAN or switched port analyzer capability). In FIG. 1, the matching engines 103 are also shown in the same sub-network as the trading engines 104. However, the matching engines 103 may instead be placed elsewhere, including anywhere on the internet. In such a case, a router is preferably placed in the same sub-network as the trading engines 103 establishing end-to-end connectivity between the trading engines 104 and matching engines 103 over the internet, or end-to-end connectivity between the trading engines 104 and matching engines 103 is otherwise established. In FIG. 1, a single trade accelerator 101 is shown working with 'm' trading engines 104 on the sub-network. However, multiple trade accelerators may be configured to work on the sub-network. The decision to use multiple trade accelerators depends primarily upon the number of matching engines 103 that are being accessed and the exchange communications protocols being used by the trading engines 104 to submit orders to matching engines 103.

Figure 2:
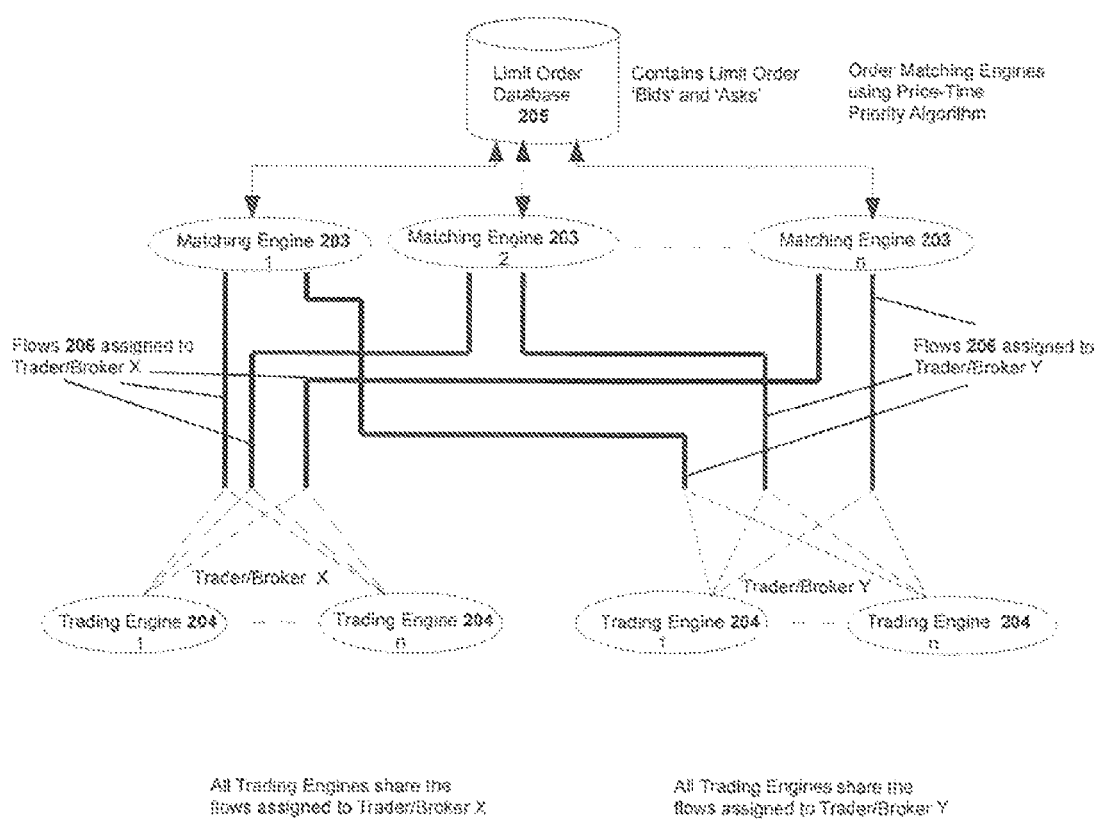
FIG. 2 is a reference logical view of a trading environment in which the trade accelerator operates according to a further embodiment of the invention.

FIG. 2 shows the reference logical view of an environment in which the trade accelerator may operate according to one embodiment of the present invention. In FIG. 2, a trading exchange, by way of non-limiting example the NASDAQ trading exchange, has multiple matching engines (ME) 203 that accept and execute trade orders issued by trader/broker companies. The matching engines 203 may be in communication with a limit order database 205. By way of non-limiting example and to ease explanation, only two trader/broker entities X and Y are shown, although any number of trader/broker companies may be involved in the environment. The trader/broker companies subscribe to and are assigned a set of communication flows (also termed ports) by the trading exchange. The trading engines (TE) 204 owned by a trader/broker company use the assigned flows to submit orders into the MEs 203. TEs 204 follow a specific communications protocol to communicate with MEs 203. For example, the OUCH protocol is used for the NASDAQ exchange; a TE 204 uses the OUCH protocol to submit trade orders to a NASDAQ ME 203. A TE 204 selects a ME 203 and submits the order by transmitting it over the assigned communication flow to that ME 203. The ME 203 executes the order using an order matching algorithm. One order matching algorithm used by MEs 203 is the price-time algorithm. In the price-time algorithm, when there is price match between multiple buyers and a seller, the orders are filled on a first-come first-serve basis. Trade orders that reach the MEs 203 sooner are accordingly more likely to be filled.

In FIG. 2, assuming that the assigned communication flows 206 (shown as the thick lines between the trader/brokers and the matching engines) are of equal bandwidth and latency, a trader/broker company may explore a couple of options to ensure that its trades reach the ME 203 faster than its competitors. One way is to ensure that the TE 204 itself is fast. Another option is to use the assigned flows 206 such that their orders are spread evenly between the MEs 203. It is known for TEs 204 to use a 'round-robin' algorithm. With such a 'round-robin' algorithm, every TE transmits orders to the MEs in a round-robin fashion. While the 'round-robin' algorithm is simple, it may not be optimal for at least the reason that a given trader/broker's TEs 204 lack knowledge about the size and number of orders being placed by competitors—or by other TEs 204 belonging to the same company—on the MEs 203. Especially during heavy trading periods, some MEs 203 may take slightly longer to accept a given trader/broker's order. While the delay is likely to be temporal in nature, a one millisecond savings in order acceptance could potentially be worth $100 million a year to a brokerage firm due to competition between firms.

In an embodiment of the present invention, a trade accelerator works with TEs 204, preferably those within the same single sub-network (as shown for example in FIG. 1) to provide recommendations on which ME 203 to send a trade order to. Thus, the known 'round-robin' algorithm need not be relied on. In an embodiment, MEs 203 that accept trade orders quicker are recommended more often than MEs 203 that exhibit a relative delay. Over time, the MEs 203 that were exhibiting delays may start to work quicker while other MEs 203 start to exhibit delays. A trade accelerator preferably detects these variations and preferably constantly adjusts its recommendations based on these variations. By using a trade accelerator, the standard 'round-robin' approach is preferably replaced by a superior 'least latency' approach that takes into consideration at least the order acceptance times of the different MEs and may additionally take into consideration the temporal nature of these deviations. A trade accelerator's overall effect from employing the 'least latency' approach may be to reduce order acceptance times for the TEs 204 (which are preferably in the same sub-network as the trade accelerator) making use of the trade accelerator.

Figure 3:
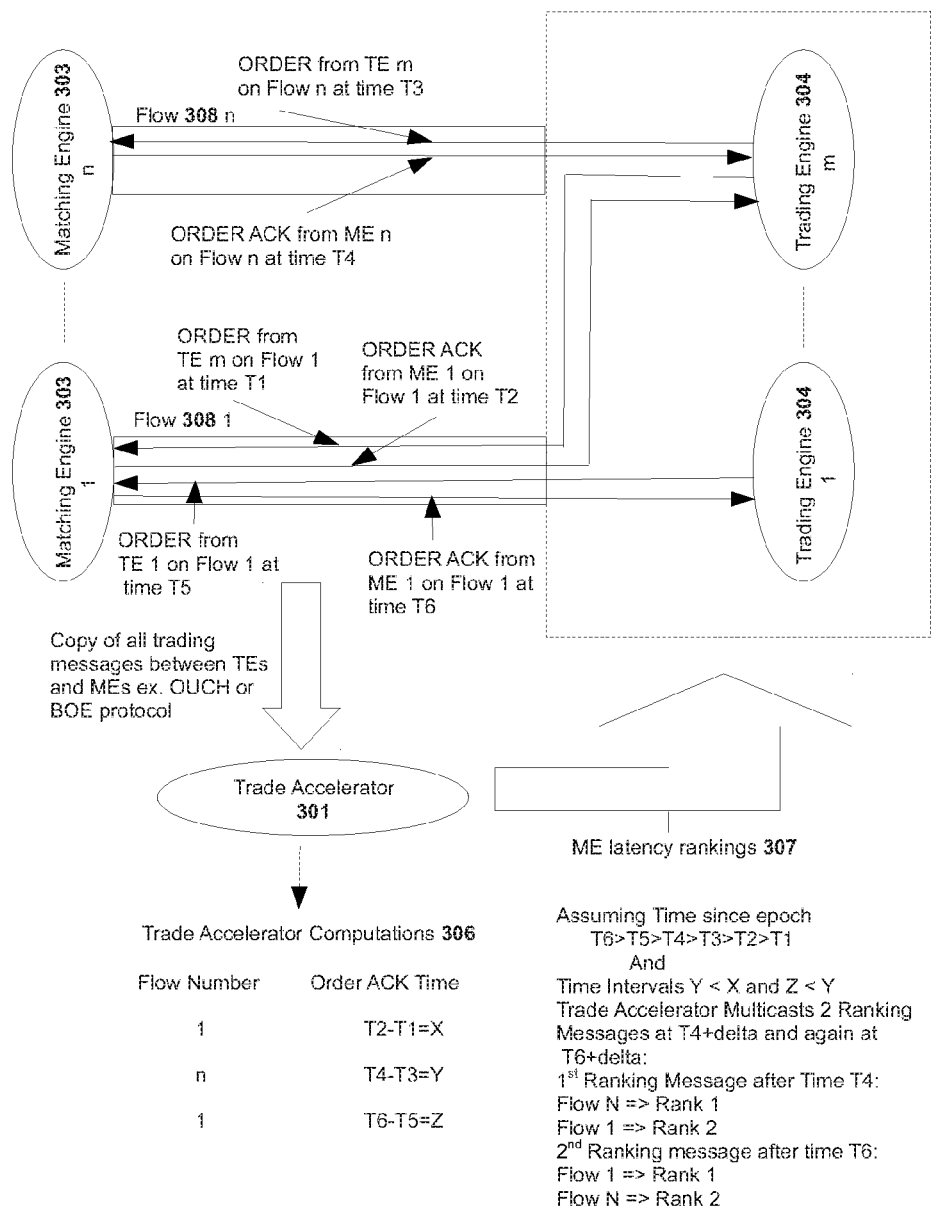
FIG. 3 shows preferred principles of operation by which the trade accelerator may compute latencies in order acknowledgment times according to yet another embodiment of the present invention.
Figure 6:
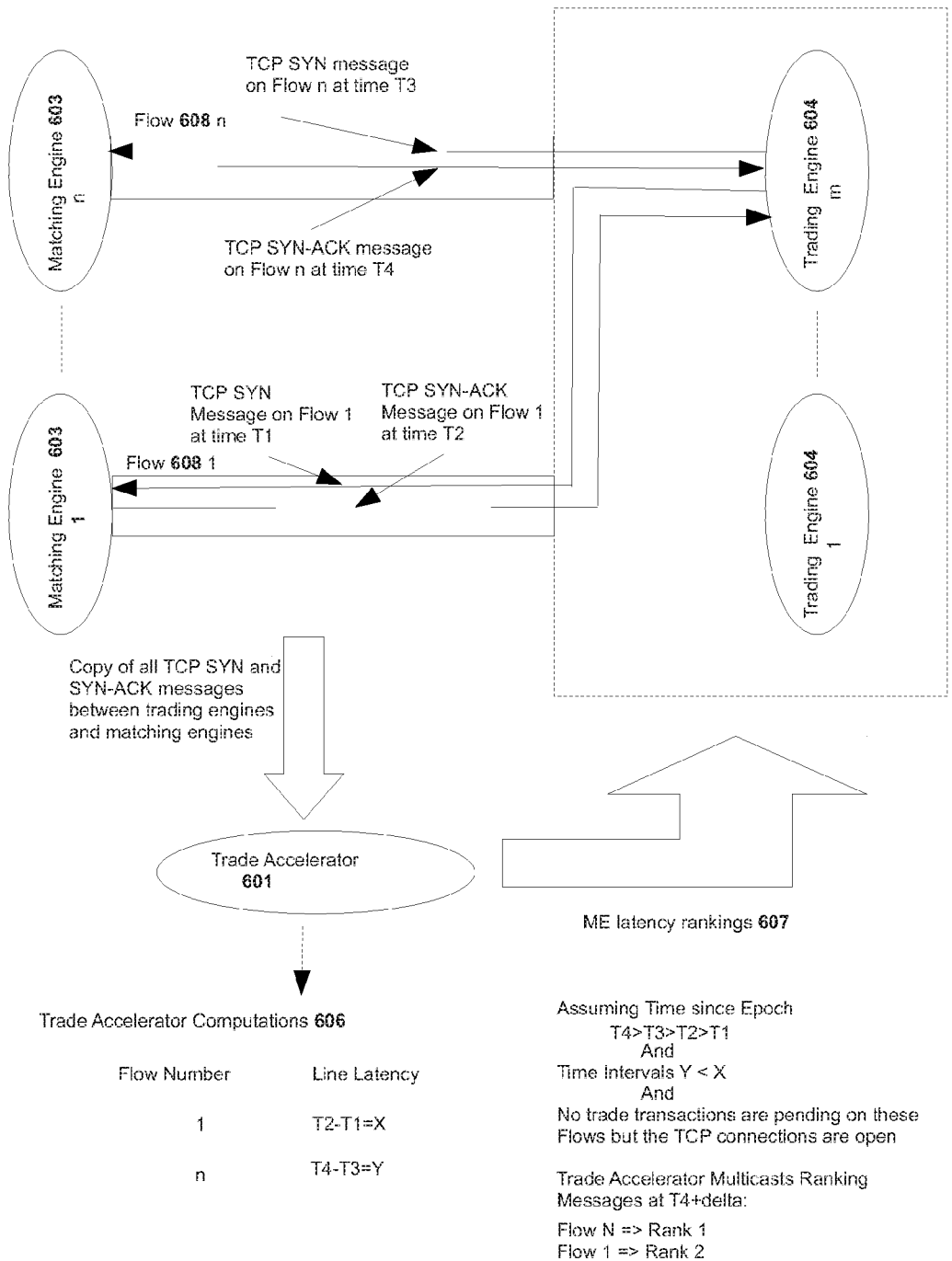
FIG. 6 shows a system and method for generating a flow ranking based on line latency according to an embodiment of the present invention.

FIG. 3 and FIG. 6 show principles of operation of the trade accelerator 301;601 according to an embodiment of the present invention. FIG. 3 shows how the trade accelerator 301 preferably computes latencies in order acknowledgment times while FIG. 6 shows how the trade accelerator 601 computes line latencies. Both computations 306;606 are used to derive a relative ranking 307;607 of the quickness of a set of MEs 303;603 (that the trade accelerator 301;601 has been configured to track). From a hardware perspective, the trade accelerator 301;601 is preferably connected to the SPAN port of a packet switch and therefore preferably receives a copy of every Ethernet packet that passes through the switch. The trade accelerator preferably examines every received packet and filters out unrelated packets i.e. it only processes trade order packets traveling over the configured flows. A flow 308; 608 may be uniquely identified by a ME's 303;603 IPv4 address and the TCP (transmission control protocol) port on which it accepts trade orders. The trade accelerator 301;601 preferably has the ability to re-assemble packets at a TCP socket level and is therefore able to capture TCP socket level traffic between the TEs 304; 604 and MEs 303;603. The socket level traffic is preferably constituted of the application level trade order protocol, for example, OUCH, between the TEs 304; 604 and MEs 303;603.

FIG. 3 shows the how the trade accelerator 301 preferably computes per-flow order acknowledgment times. In FIG. 3, the trade accelerator 301 keeps track of the time-difference between a trade order and the corresponding trade order acknowledgment, on a per-flow basis. Using these time-differences, it, preferably constantly or approaching constantly, computes a moving average of the order acknowledgment time for each flow 308. The flow 308 with the lowest moving average is preferably ranked first. All the other configured flows 308 are preferably also ranked according to their respective moving averages. A multicast message is sent out to all subscribing TEs 304 containing the relative rankings 307 of the configured flows 308. Preferably, whenever a change in rankings is detected while computing the moving averages, a new rankings list is compiled by the trade accelerator 301 and multicast to the subscribing TEs 304.

FIG. 6 shows how the trade accelerator 601 preferably computes line latencies in the absence of trading traffic, and uses that information to rank the flows 608. This method is preferably used only when there is no trading traffic on the flows 608. During such quiescent periods, there is no means to compute ME 603 latency since there is no trade order traffic. Line latencies computed during TCP connection establishment are preferably used. The trade accelerator 601 preferably notes the difference in time between the TCP SYN packet and the TCP SYN ACK exchanged during connection establishment on a flow 608. This is used for initial flow rankings 607.

Figure 4:
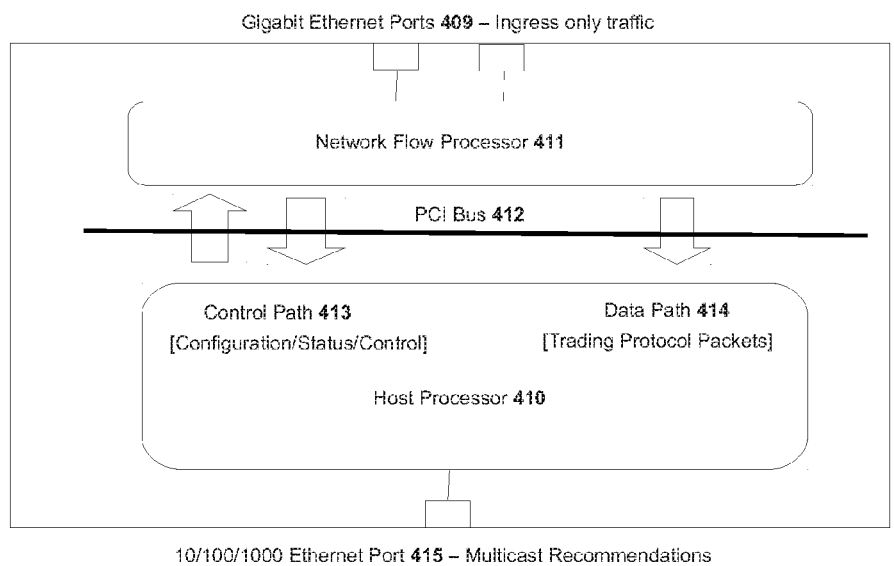
FIG. 4 shows one embodiment of a hardware architecture for the trade accelerator according to a further embodiment of the present invention.

FIG. 4 shows the arrangement of hardware components that preferably are included in the trade accelerator. These include a network processor 411 (also called a network flow processor or an NFP) and a host processor 410 connected over a PCI bus 412. The network processor 411 is preferably connected to the SPAN port of a packet switch 102 as shown in FIG. 1, and preferably receives information over ports 409 such as, without limitation, gigabit ethernet ports. The Network Processor 411 preferably accomplishes packet re-assembly up to the TCP socket level, on the configured flows. The network processor 411 delivers time-stamped socket-level traffic (i.e. trading protocol packets) to the host processor 410 for further processing. The host processor 410 preferably tracks the trading protocol traffic on the flows, determines the flow rankings, and sends out a multicast to subscribing TEs (preferably over a port 415, including without limitation a 10/100/1000 ethernet port). The Host Processor and the Network Processor preferably communicate over a PCI bus 412. This could be any of the PCI bus variants, for example PCI, PCI-X or PCI-e. There is a logical control path 413 and data path 414 between the two processors 410;411. The host processor 410 preferably uses the control path 413 to download micro-code, start, initialize and configure the network processor 411. Flow tracking commands are also preferably issued over this control path 413. Responses to commands as well as notifications about the availability of a trading protocol packet are also preferably sent to the host processor 410 over this control path 413. The data path 414 is preferably used by the network processor 411 to deliver fully assembled socket data from the configured TCP flows. Details about the socket data are preferably presented on the control path 413.

Figure 5:
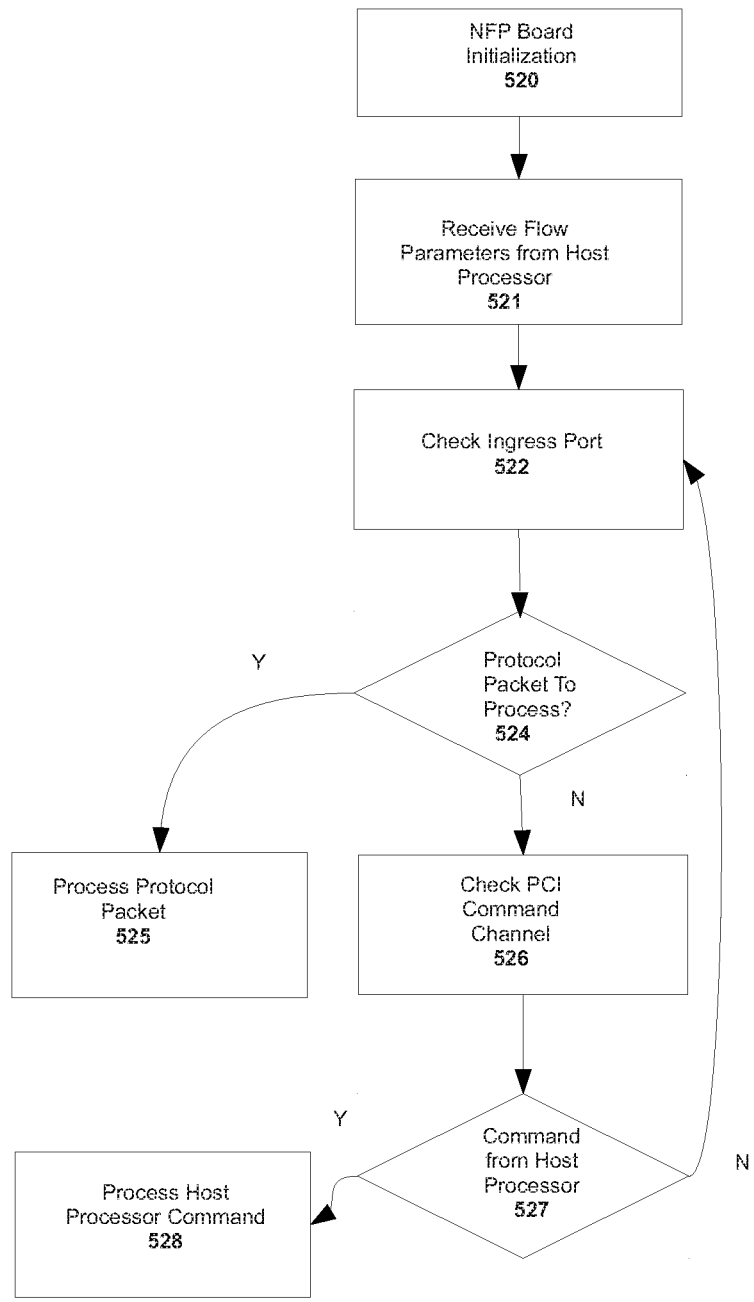
FIG. 5 is a flow chart showing the network processor firmware flow according to an embodiment of the present invention. The overall flow of the network processor micro-code is shown in this flow chart.

The preferable overall flow of the network processor micro-code is shown using the flow chart on FIG. 5. Once the network processor is initialized, configured and started up, it preferably either processes commands from the host processor or assembles socket level data flowing over the configured TCP flows. In this flow shown in FIG. 5, first initialization, such as NFP board initialization, occurs at step 520. Then flow parameters are received from the host processor at step 521. The ingress port is checked at step 522. A determination is made as to whether there is a protocol packet requiring processing at step 524. If so, it is processed at step 525. Otherwise, the PCI command channel is checked at step 526. A determination is then made as to whether there is a command from the host processor at step 527. If so, the command is processed at step 528. Otherwise, the process returns to step 522.

Figure 7A:
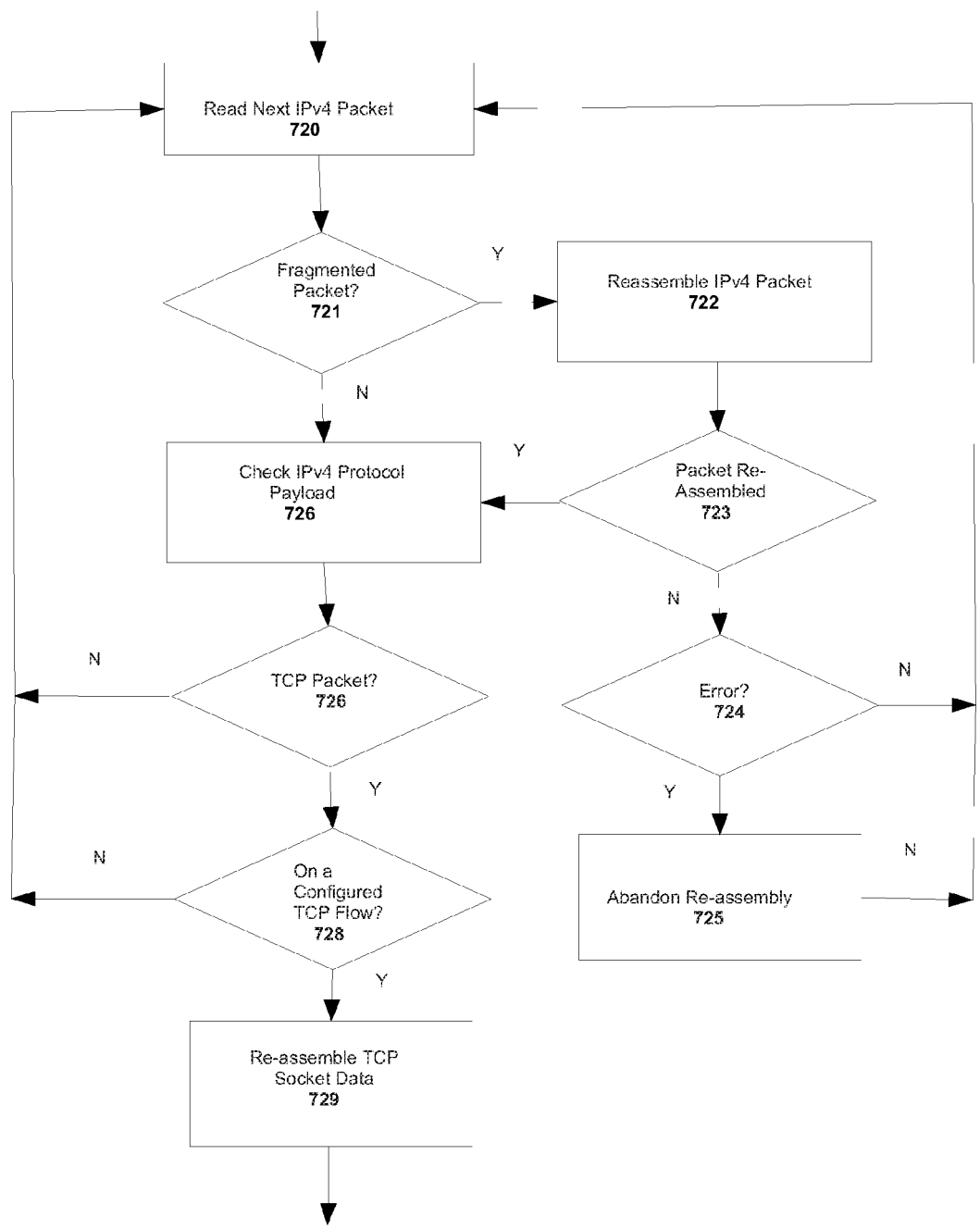
FIGS. 7A and 7B are a flow chart showing a process for assembling socket-level traffic and delivering them to the host processor according to a network processor firmware processing method of an embodiment of the present invention.
Figure 7B:
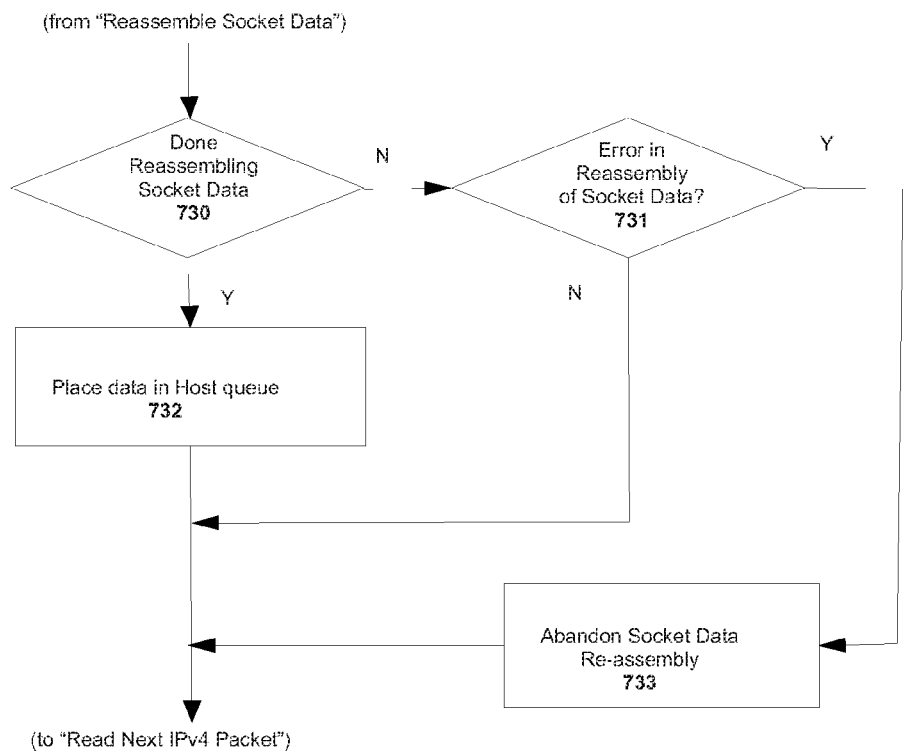

FIGS. 7A and 7B depict steps in assembling socket-level traffic and delivering them to the host processor. The payload delivered by the network processor to the host processor are preferably trading protocol packets (for example packets configured according to the OUCH protocol) exchanged between the TEs and the MEs. The network processor also sends indications on the control path to the host processor whenever it detects a TCP-SYN or a TCP-SYN-ACK on any of the configured flows. Preferably, all indications are time-stamped by the Network Processor with nanosecond granularity.

In the process of FIGS. 7A and 7B, a packet such as an ivP4 packet is read at step 720. If the packet is fragmented, as determined at step 721, an attempt at reassembly is made at step 722. If it is determined at step 723 that this reassembly did not occur, then an error check is performed at step 724. If there was an error, then re-assembly is abandoned at step 25 and a new packet is read. In the absence of an error, the next packet is also read. If it is determined at step 723 that this reassembly was successfully accomplished, of if the packet was determined at step 721 not to be fragmented, then the packet's payload is checked at step 726. If the packet is determined to be a TCP packet (at step 727) and on a configured TCP flow (at step 728), then an attempt is made to re-assemble the TCP socket data at step 729. Otherwise, the next packet is read. After this attempt, a check is performed as to whether the re-assembly has been done at step 730. If so, the data is placed in a host queue at step 723 and then the next packet is read. Otherwise, a determination is made as to whether there has been an error in the reassembly of the socket data at step 731. If so, the socket data re-assembly process is abandoned at step 733, and then the next packet is read. Otherwise, the next packet is also read.

Figure 8:
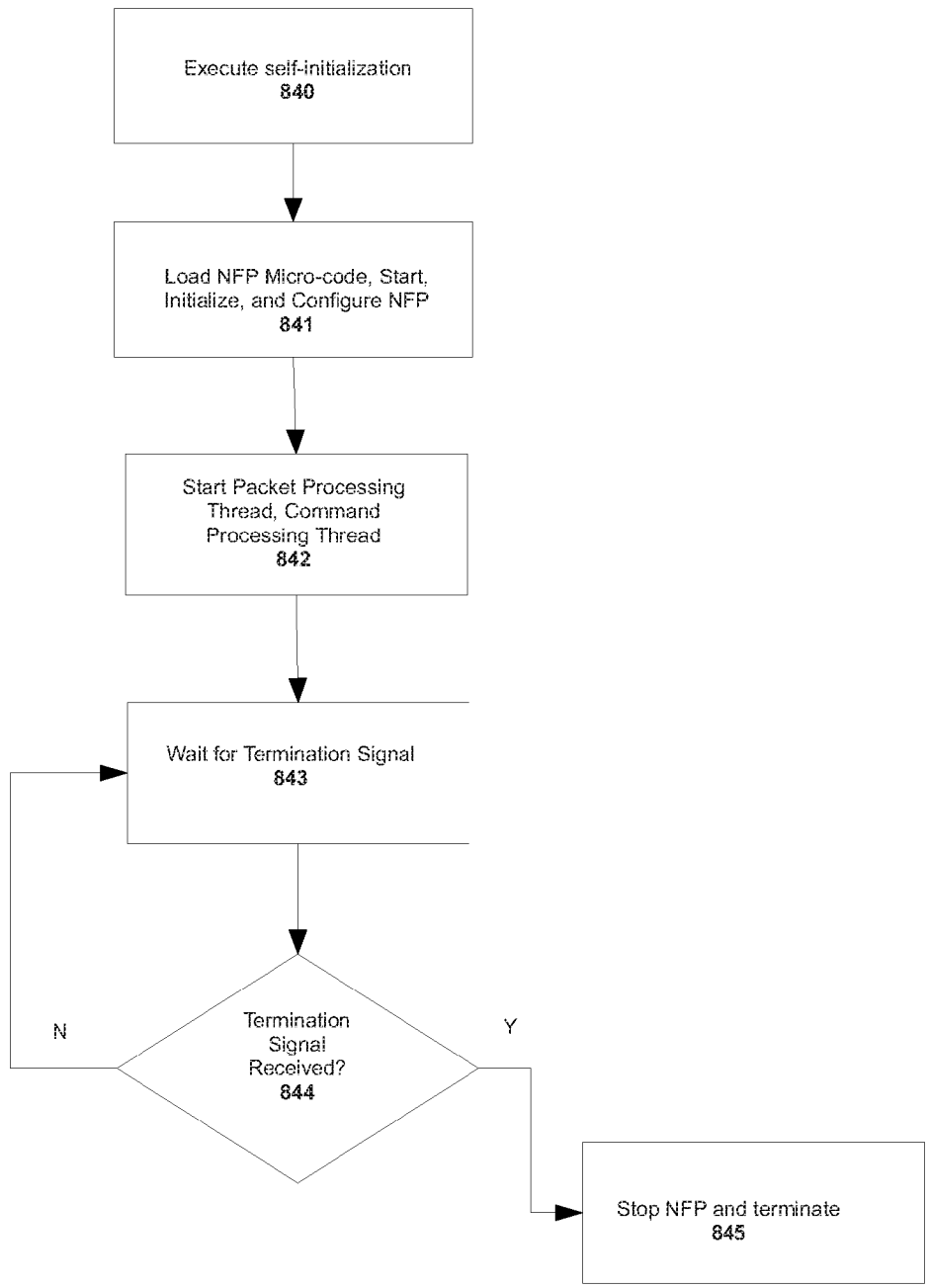
FIG. 8 is a flow chart showing a method of host side processing according to an embodiment of the present invention.
Figure 9:
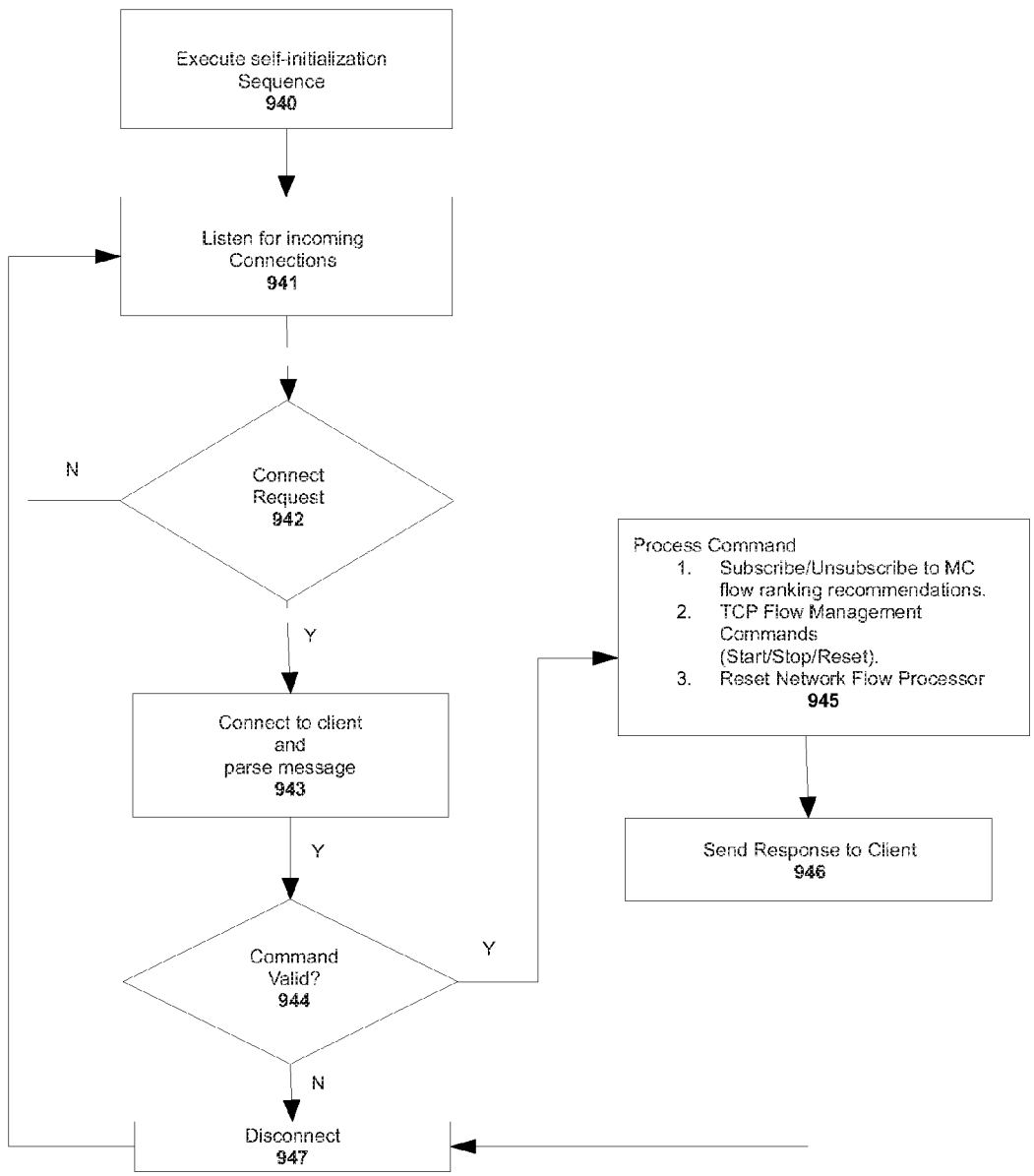
FIG. 9 is a flow chart for a host command processing thread according to an embodiment of the present invention.

On the host processor side, with reference to FIG. 8, the software preferably executes on two processing threads after start-up, initialization and configuration (which includes downloading micro-code to the network processor). Initially, self-initialization is executed (step 840), then NFP micro-code is loaded, and starting, initialization and configuration of NFP occurs (step 841). Then, a packet processing thread and a command processing thread are started (step 842). Then, once it is determined that a termination signal is received (steps 843 and 844), NFP is stopped and termination occurs (step 845). On one thread indications or responses coming from the network processor are processed. On the other thread connection requests and subsequent commands coming in from any external client are responded to. The commands preferably include or relate to subscription requests to receive flow rankings, flow management commands (for example, commands to start tracking a flow, to stop tracking a flow, and to reset a flow) and network processor control commands such as stop, start or reset. This is as shown in FIG. 9. In this figure, a self-initialization sequence is executed (step 940). Then, the system listens for incoming connections (step 941). Once a connect request is determined to be received (step 942), the system connects to the client and parses a message (step 943). If the message is determined to not comprise a valid command, then the system disconnects from the client (step 947) and returns to listening for incoming connections (step 941). Otherwise, the command is processed (step 945) and a response is sent to the client (step 946).

Figure 10:
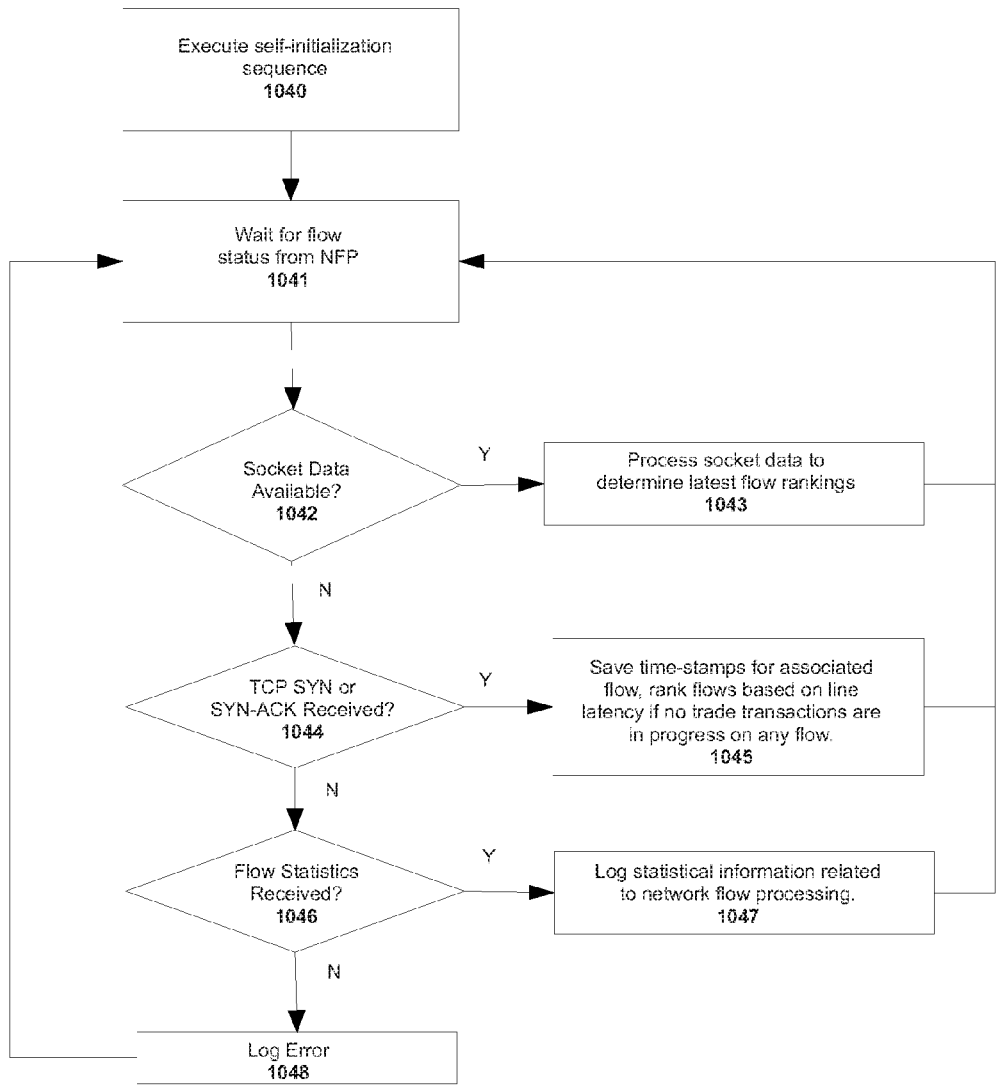
FIG. 10 is a flow chart for a host packet processing thread according to an embodiment of the present invention.

FIG. 10 shows the main processing loop of the thread that preferably handles indications and/or responses from the network processor, on the logical control path. Initially, a self-initialization sequence is executed (step 1040), and then the system waits for flow processing status from NFP (step 1041). The host processor either receives an indication (at step 1042) about the availability of socket data (such as TCP socket data containing a trading protocol packet) on the logical data path (and processes this socket data to determine the latest flow rankings at step 1043), an indication (at step 1044) that a TCP SYN or SYN-ACK was received on a tracked flow, or an indication (at step 1046) that flow-related statistics were received, preferably from the network processor. Flow related statistical data is suitably logged (at step 1047), preferably by the host processor. For TCP-SYN or TCP SYN-ACK, the system notes (at step 1045) the time-stamps and computes the line latency on the flow as shown in FIG. 6. If there is a quiescent period, the flow rankings are based on the relative line latency computed from these indications. While a particular order is shown in FIG. 10, it will be understood that the checks for the three indications (and sequential checks shown in the other figures) can be performed in other orders. If none of these three indications are received, then an error is logged at step 1048.

Figure 11:
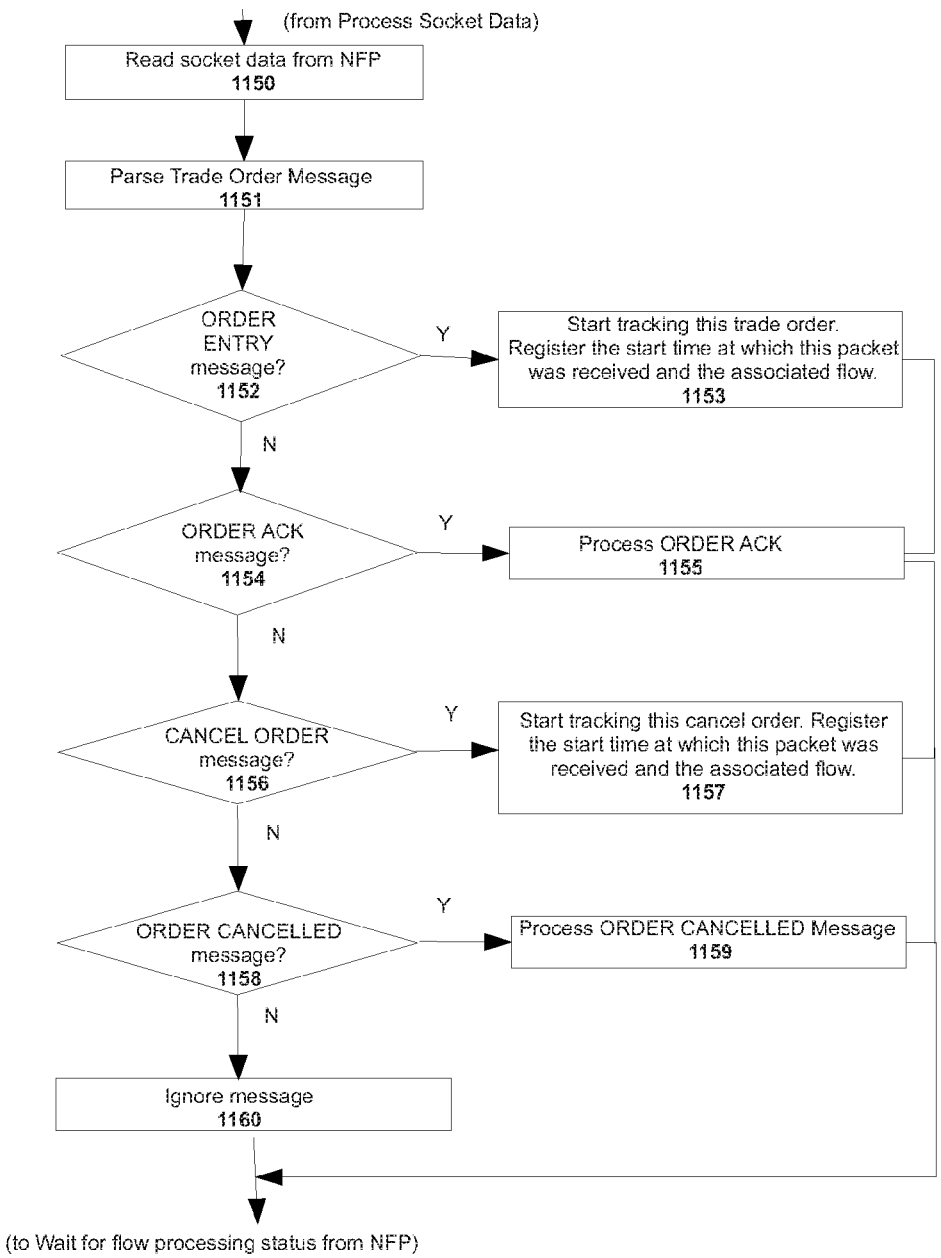
FIG. 11 is a flow chart for socket data processing according to an embodiment of the present invention.

FIG. 11 shows how the host processor handles incoming TCP socket data from the network processor. Initially, the socket data is read from the NFP (at step 1150). For the supported trade protocol (for example OUCH), the protocol packet is parsed (at step 1151) to detect the type of message and the associated TCP flow on which it was sent by the TE. If a request for a new trade order is detected (at step 1152), a new order entry is created with a time-stamp indicating when this order request was placed (at step 1153). Multiple trade orders are tracked simultaneously by the host processor on any configured flow. Similarly if a new order cancel is requested and detected (at step 1156), it is also tracked (at step 1157).

A flow rankings activity can be triggered when a trade 'order acknowledgment' packet from an ME to a TE is detected (at step 1154) by the host processor on a configured flow and that particular order is currently being tracked by the host processor. Similarly a detected (at step 1158) trade 'order canceled' packet can also trigger a fresh flow rankings activity. Both types of messages are processed. (at steps 1155 and 1159, respectively). It is sometimes possible that the host processor may miss receiving trade/cancel order requests or their corresponding acknowledgments. This is because, during heavy traffic conditions, the network switch may drop packets destined for the SPAN or mirrored ports. Any such mismatch (for example, receiving an order acknowledgment packet with the original trade order never having been received by the host processor) causes the host processor to discard the packet and decay out the pending order or order cancel. If the message is none of the four types listed above, it is ignored (at step 1160).

Figure 12:
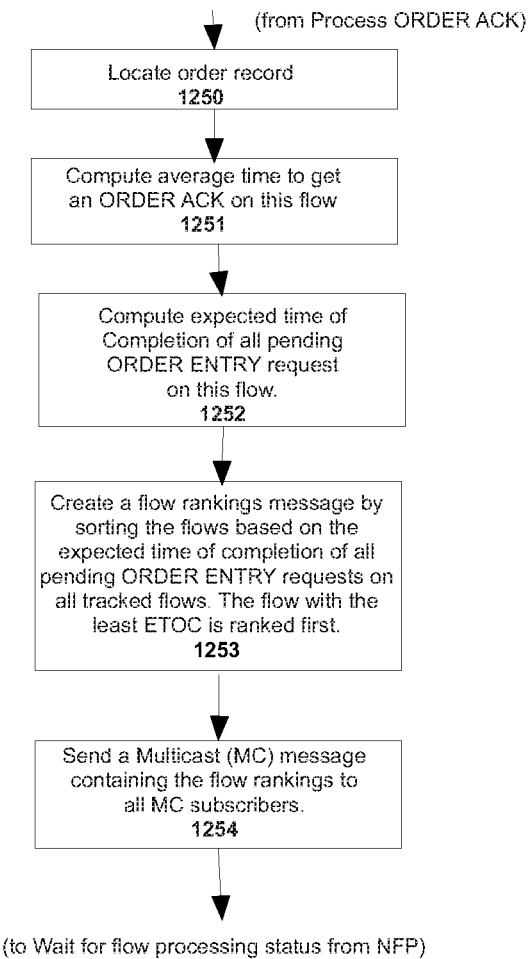
FIG. 12 is a flow chart showing a method for processing order acknowledgments to generate and transmit flow rankings according to an embodiment of the present invention.

FIG. 12 shows how an 'order acknowledgment' packet is handled and how it triggers a fresh flow rankings activity. The order entry record is located (at step 1250) and the duration it took to get an 'order acknowledgment' from the ME is computed (at step 1251) by subtracting the time at which the order request was sent from the time at which the order acknowledgment was received. A cumulative moving average formula (depicted in FIG. 12) is preferably applied to compute the new average order acknowledgment time for the flow. This new average order acknowledgment time is used to compute (and update) the expected time of completion of all pending orders/order cancels on that flow (at step 1252). Following this, the expected time of completion of all pending orders/order cancels on all flows are compared and ranked. The flow with the lowest expected time of completion is ranked the highest. A ranking message is created (at step 1253)—containing the flow rankings—and multicast to all subscribing TEs on the sub-network (at step 1254).

Figure 13:
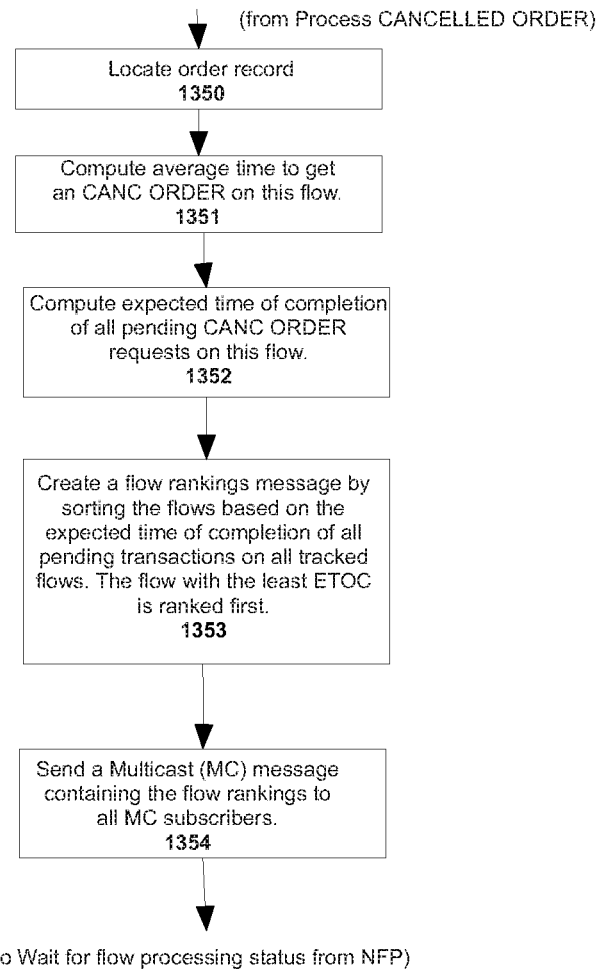
FIG. 13 is a flow chart showing a method for processing cancelled orders order to generate and transmit flow rankings according to an embodiment of the present invention.

FIG. 13 shows how an 'order cancellation' packet is handled and how it triggers a fresh flow rankings activity. The order entry record is located (at step 1350) and the duration it took to get an 'order cancelled' message from the ME is computed (at step 1351) by subtracting the time at which the cancellation request was sent from the time at which the cancellation acknowledgment was received. A cumulative moving average formula (depicted in FIG. 13) is preferably applied to compute the new average order cancellation time for the flow. This new average order cancellation time is used to compute (and update) the expected time of completion of all pending orders/order cancels on that flow (at step 1352). Following this, the expected time of completion of all pending orders/order cancels on all flows are compared and ranked. The flow with the lowest expected time of completion is ranked the highest. A ranking message is created (at step 1353)—containing the flow rankings—and multicast to all subscribing TEs on the sub-network (at step 1354).

Figure 14:
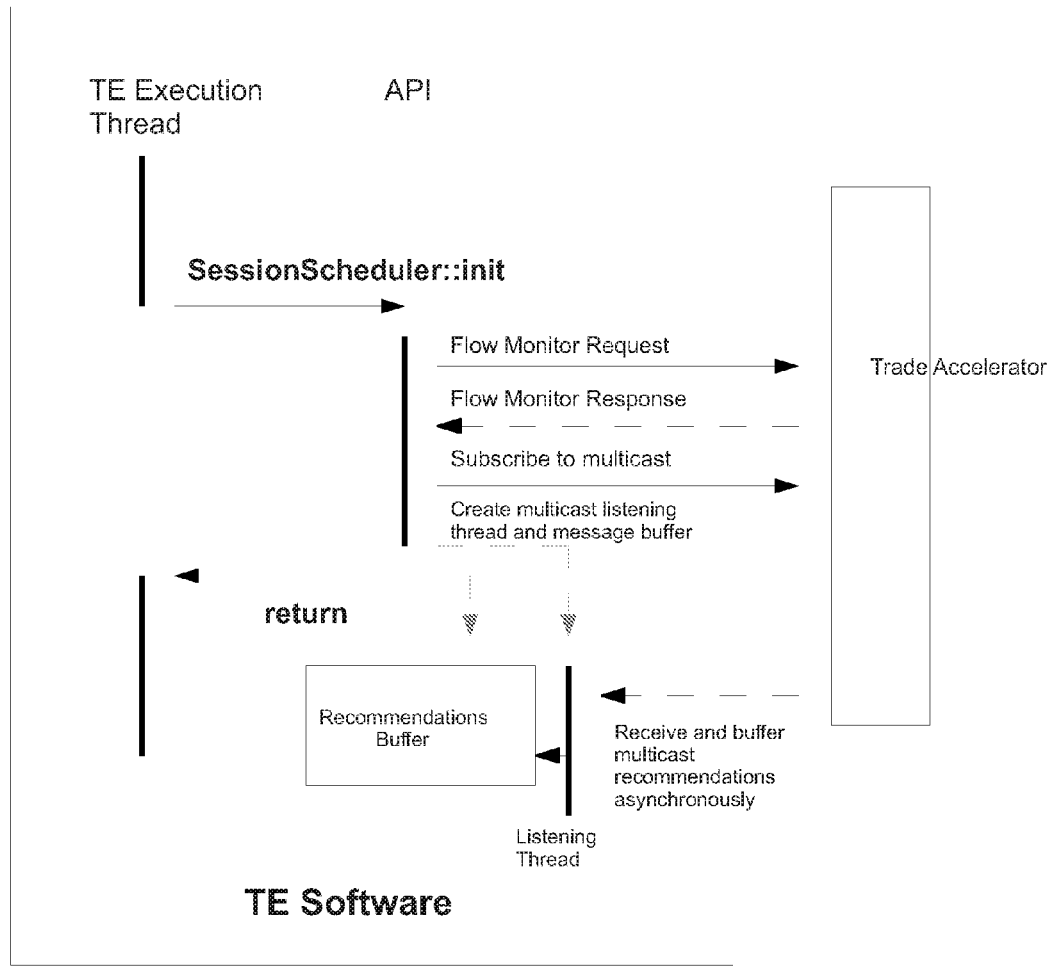
FIG. 14 is a detailed view of the functioning of an application programming interface to one embodiment of the trade accelerator according to an embodiment of the present invention which allows for subscription to multicast recommendations.

The trade accelerator is preferably used by executing the following steps:
1. Configure the trade accelerator to monitor the desired flows. Each TCP flow is preferably identified by an IP address, a port number and a nickname for the flow. Preferably, up to 255 flows can be monitored. The trade accelerator monitors the configured flows and sends multicast flow recommendations. These periodic multicasts can be subscribed to by the TE and used while placing orders.
2. On start-up, the TE software preferably indicates to the trade accelerator the TCP flows on which it intends to transact with the MEs. It preferably also subscribes to receive the multicast flow recommendations from the trade accelerator. This is preferably done by the TE using the SessionScheduler::init method. Once this method is executed, the API code preferably starts to asynchronously receive and buffer the multicast flow recommendations, for example as shown in FIG. 14.

Figure 15:
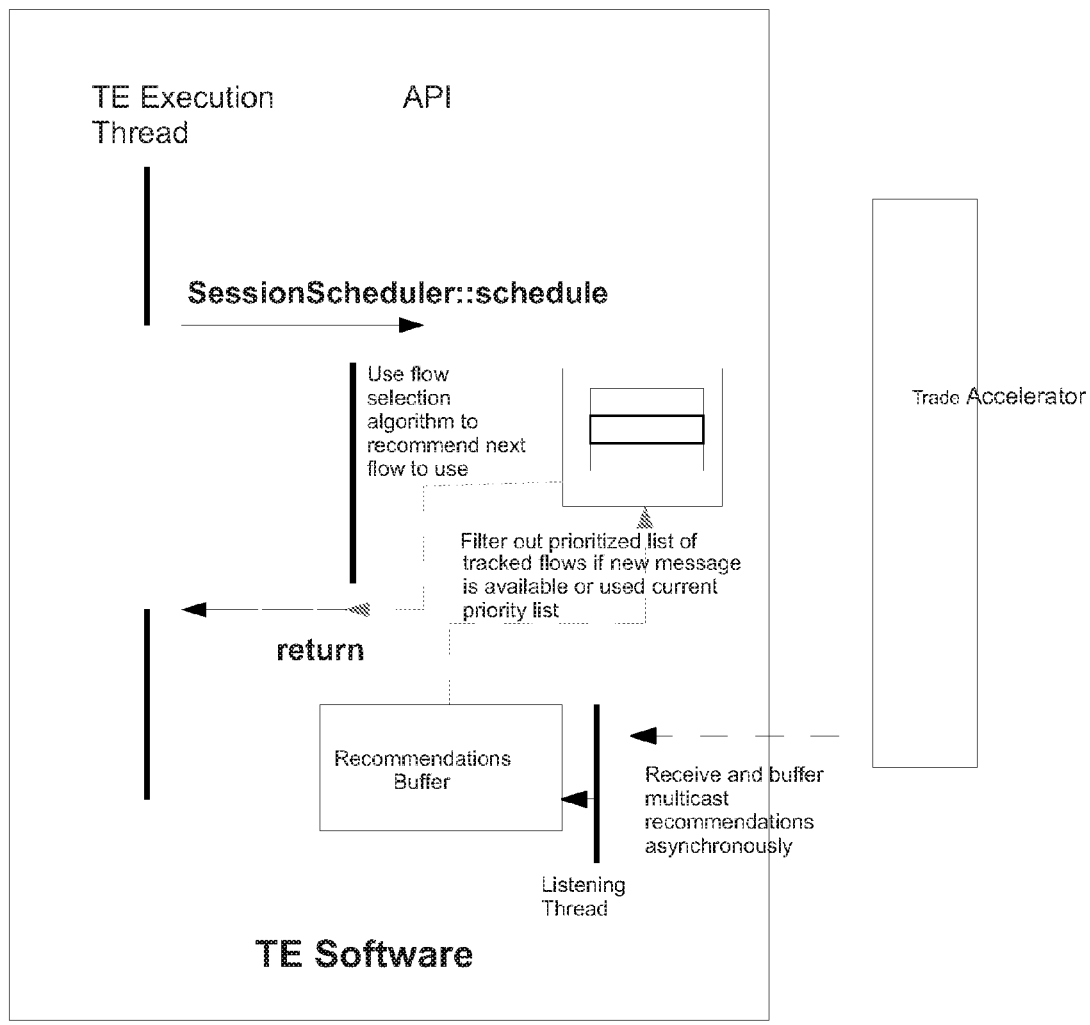
FIG. 15 is a detailed view of the functioning of an application programming interface to a trade accelerator according to an embodiment of the present invention which allows for obtaining flow rankings.

3. When the TE is ready to start a trade transaction (for example, ENTER CONTINUOUS ORDER or CANCEL ORDER for the OUCH protocol), it may ask for a recommendation on the best TCP flow to use to transmit the order. The API preferably returns with the nickname of the recommended flow, although other information uniquely identifying the recommended flow may also be used. The SessionScheduler::schedule method is used to get a flow recommendation as shown in FIG. 15.

Figure 16:
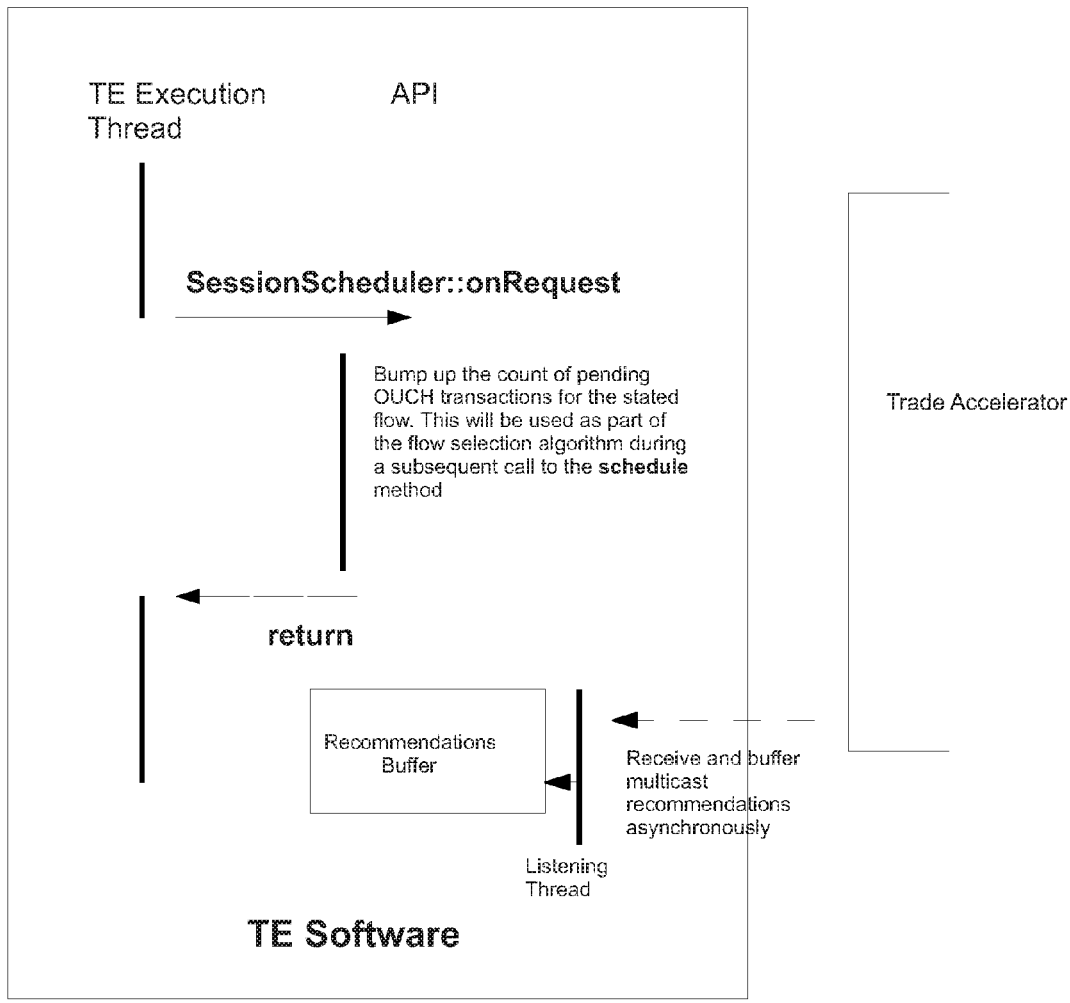
FIG. 16 is a detailed view of the functioning of an application programming interface to a trade accelerator according to an embodiment of the present invention which allows for tracking flow usage, in particular by increasing the count of pending OUCH transactions for a stated flow.

4. Tracking pending trade transactions on the monitored flows assists the API in providing the best possible recommendation between trade accelerator multicasts. The API preferably requires that the TE software inform it on the initiation of a new trade transaction (for example, ENTER CONTINUOUS ORDER, ENTER CROSS ORDER or CANCEL ORDER for the OUCH protocol). On transmitting the trade protocol message associated with these transactions, the TE software preferably invokes the SessionScheduler::onRequest method with the nickname of the TCP flow on which the trade protocol message was transmitted, for example as depicted in FIG. 16.

Figure 17:
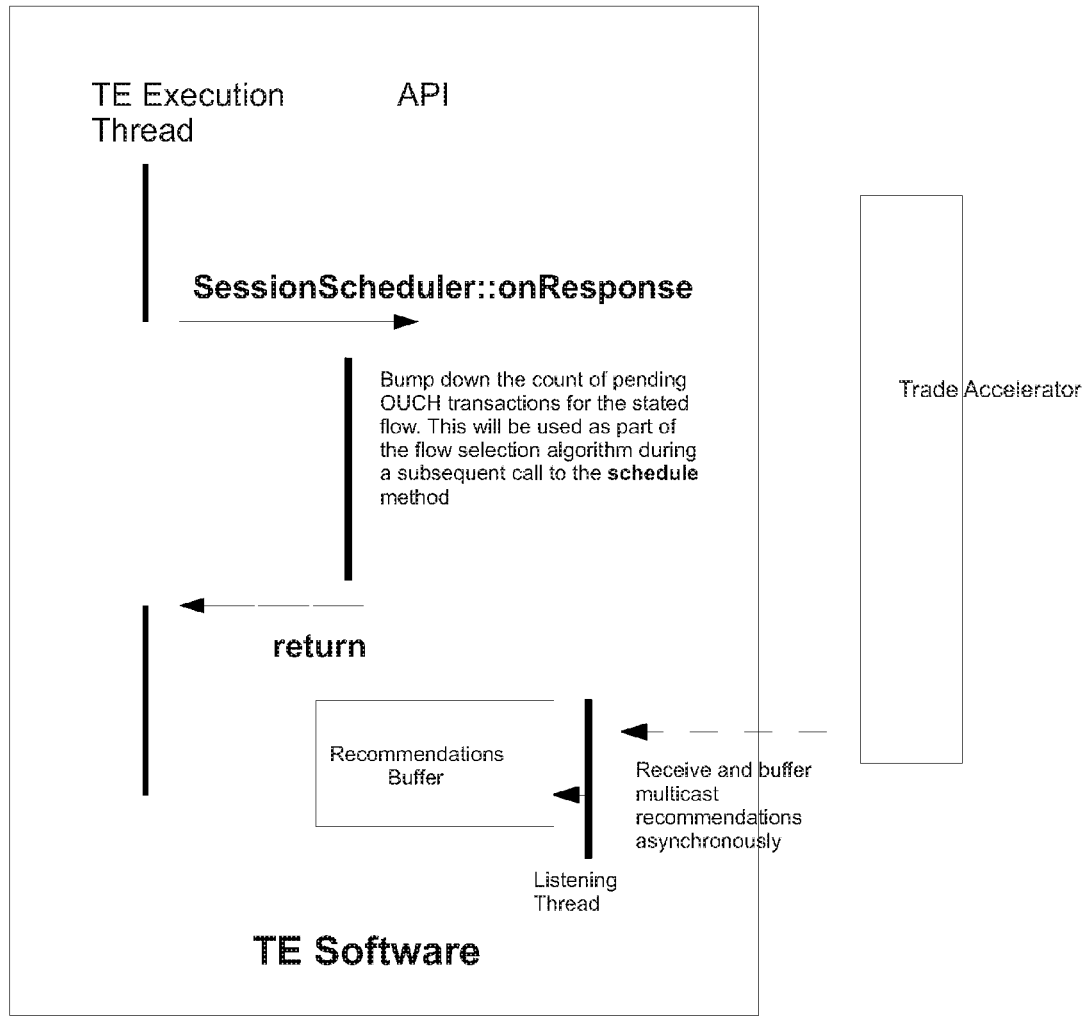
FIG. 17 is a detailed view of the functioning of an application programming interface to a trade accelerator according to an embodiment of the present invention which allows for tracking flow usage, in particular by decreasing the count of pending OUCH transactions for a stated flow.

5. Similarly, when a trade transaction is completed (for example, CONTINUOUS ORDER ACCEPTED, CROSS ORDER ACCEPTED or CANCELED ORDER ACCEPTED for the OUCH protocol), the API is preferably informed in order for it to adjust its TCP flow recommendations between trade accelerator multicasts. The TE software preferably invokes the SessionScheduler::onResponse method with the nickname of the TCP flow on which the trade protocol message was received, for example as depicted in FIG. 17.

Figure 18:
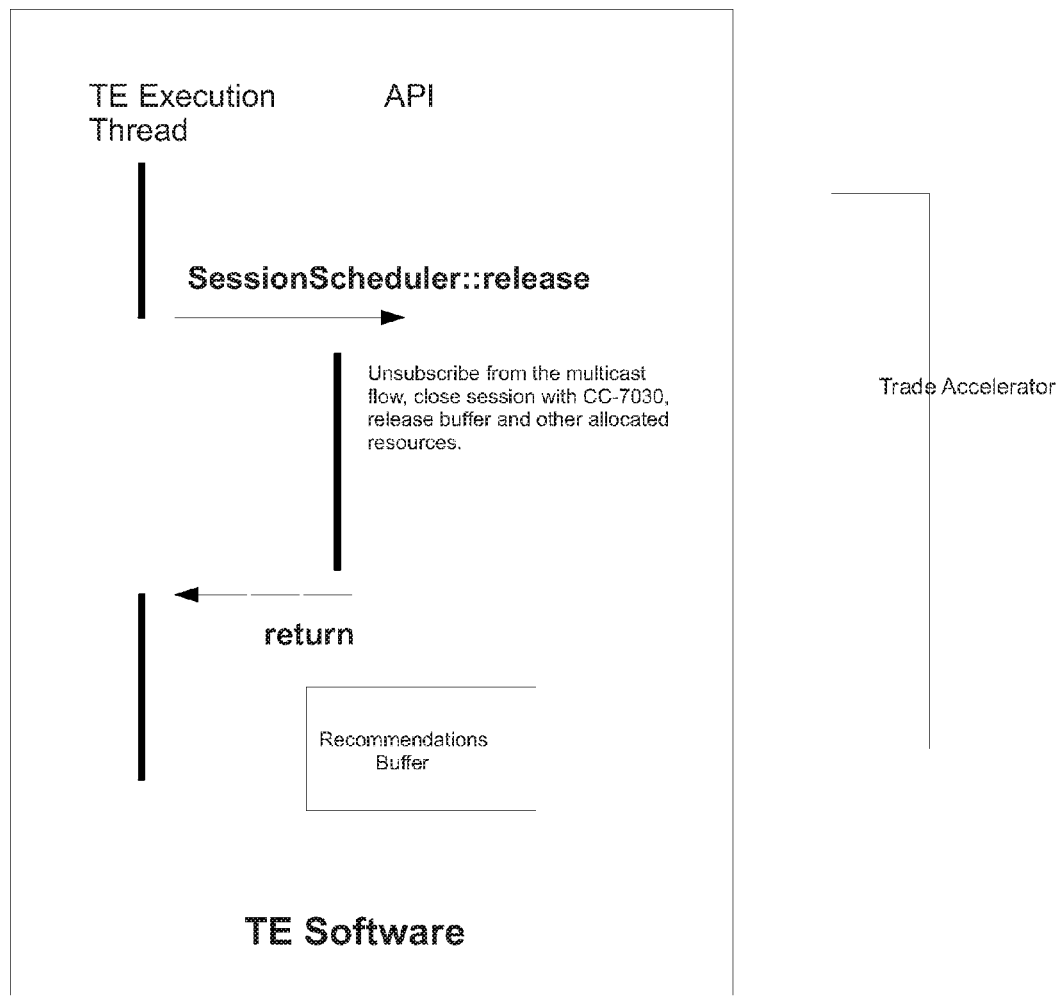
FIG. 18 is a detailed view of the functioning of an application programming interface to a trade accelerator according to an embodiment of the present invention which allows for unsubscribing from trade accelerator multicasts.
Figure 19:
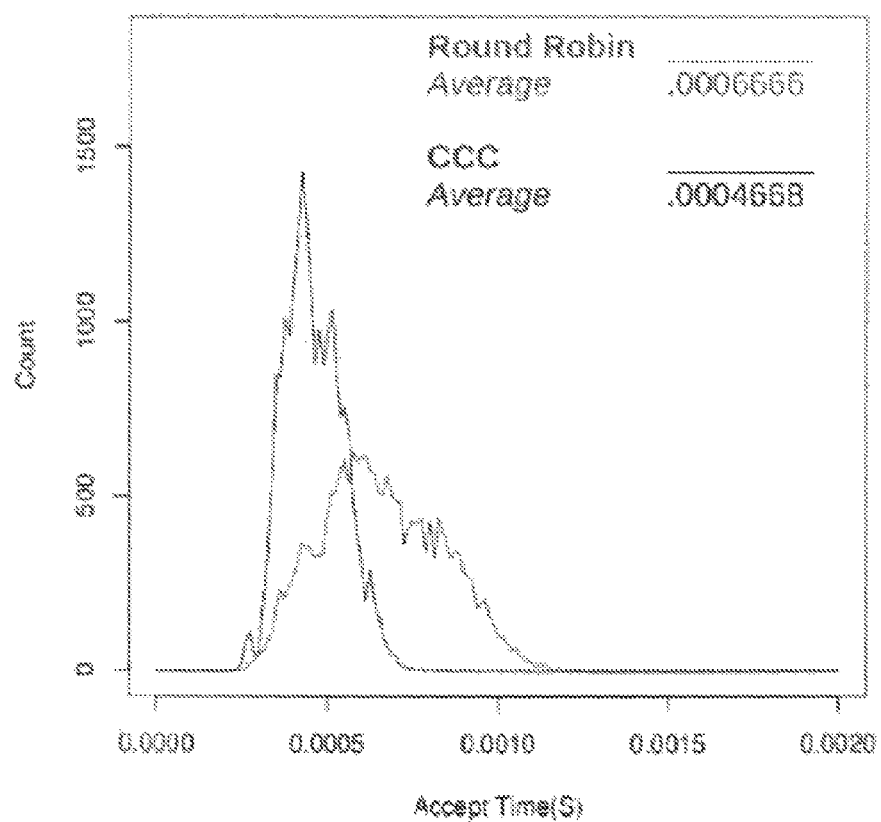
FIG. 19 is a chart comparing generally faster order acceptance times according to an embodiment of the present invention with generally slower order acceptance times using a "Round Robin" algorithm. The taller, left-shifted peak corresponds to the present invention, while the shorter, right-shifted peak corresponds to the "Round Robin" algorithm.

6. If and when the TE is ready to stop using the trade accelerator's flow recommendations, it preferably unsubscribes from the multicast and releases computing resources held for that purpose. The TE preferably unsubscribes by invoking the SessionScheduler::release method, as depicted in FIG. 18.

According to one embodiment of the present invention, the disclosed systems and methods allow for delivery and configuration of flow rankings, such as TCP flow rankings, to subscribing TEs. In a further embodiment, a multicast message can carry the flow rankings, which can be a fixed-length message, and which can have reserved slots to carry flow rankings, such as on a per-subscription identifier basis. A subscription-identifier is a unique way for a stock exchange to identify a trading account. Each trader/broker company may have one or more subscription identifiers on a stock exchange. A trader/broker company may organize to trade on these subscription accounts over a unique set of TCP flows rented from the exchange (for example, all trades done under subscription identifier "XYZ" may travel on TCP flows "NASD01" to "NASD04" while all trades done under subscription identifier "ABC" may travel on TCP flows "NASD05" to "NASD08"). In yet another embodiment, the trade accelerator reserves slots and/or byte locations in the multicast message for a set of flows belonging to a particular subscription identifier. The TEs may be informed about the locations in the multicast message where flow ranking information will be available for the trading account that it will use to place trades. Each associated TCP flow may be identified by a unique flow identification number. This may be done as part of a SessionScheduler::init API functionality, for example as discussed above in connection with FIG. 14.

In one embodiment which may be understood as extending the previous example, the trade accelerator may inform a TE that ranking information related to subscription identifier "XYZ" will be available in multicast message byte locations 1, 4, 6 and 7, thereby implying that the top ranked TCP flow associated with subscription identifier "XYZ" will be found in message byte location 1, the next in byte location 4 and the last ranked flow in message byte location 7. Further, the trade accelerator may assign unique TCP flow identifiers that will be used in the rankings message such as 6 for "NASD01", 10 for "NASD02", 25 for "NASD03" and 40 for "NASD04". Once this bind is performed by the trade accelerator, the TE is ready to receive and process the multicast ranking message.

In certain embodiments, the trade accelerator may associate a logical TCP flow name such as "NASD01" with a unique address (such as an IPv4 address) and TCP port number which represents the exact exchange server destination to which a trade order will be delivered. This may be configured into the trade accelerator at start-up. Preferably, when the trade accelerator creates a flow rankings message, following the above example, if the flow rankings are "NASD04", "NASD01", "NASD03" and "NASD02" then in the rankings message, byte location 1 will contain 40, byte location 4 will contain 6, byte location 6 will contain 25 and byte location 7 will contain 10.

By using such methods as are described herein for reporting rankings, multiple groups of trading accounts tied to associated groups of TCP flows may be supported.

While the invention has been particularly shown and described with reference to the embodiments thereof, those skilled in the relevant art will understand that changes in form and detail may be made to these embodiments without departing from the spirit and scope of the invention. For example, although the invention has been shown with respect to particular financial products and trades, trading exchanges, and protocols, the present invention may also be used with respect to other financial products or trades, other trading exchanges, and with other protocols as well as with similar latency sensitive transactions outside of trading.

What is claimed is:

1. A financial transaction reporting system, comprising:
a trade accelerator configured for communication with at least one trading engine and a plurality of matching engines associated with a plurality of flows, the trade accelerator comprising a host processor and a network flow processor, wherein the network processor and host processor communicate and the network processor is connected to the SPAN port of a packet switch, the trade accelerator configured to monitor the plurality of flows and generate and transmit flow recommendations to at least one trading engine.

2. The system of claim 1, wherein the trade accelerator comprises a PCI bus over which the network flow processor and host processor communicate, a first ethernet port configured to transmit trade order information to the network flow processor, and a second ethernet port configured to transmit the flow recommendations.

3. The system of claim 1, wherein the trade accelerator is located in the same sub-network as at least one trading engine.

4. The system of claim 2, wherein the trade accelerator is located in the same sub-network as the plurality of matching engines.

\* \* \* \* \*